United States Patent [19]

Croket

[11] Patent Number: 4,919,825

[45] Date of Patent: Apr. 24, 1990

[54] FILTER APPARATUS AND METHOD FOR SEPARATING CONTAMINANTS FROM LIQUIDS

[75] Inventor: Frank M. Croket, Jefferson County, Ky.

[73] Assignee: Hallco Fabricators, Inc., Louisville, Ky.

[21] Appl. No.: 325,867

[22] Filed: Mar. 20, 1989

[51] Int. Cl.$^5$ .................. B01D 33/02; B01D 33/12
[52] U.S. Cl. ............................. 210/783; 210/236; 210/387; 210/401; 210/406; 210/784
[58] Field of Search ............... 210/111, 138, 386, 387, 210/392, 396, 400, 401, 406, 416.1, 783, 784, 196, 236, 402

[56] References Cited

U.S. PATENT DOCUMENTS

| | | | |
|---|---|---|---|
| 3,371,791 | 3/1968 | Schryver | 210/396 |
| 3,372,811 | 3/1968 | Arnold et al. | 210/387 |
| 3,836,006 | 9/1974 | Davis | 210/401 |
| 4,123,362 | 10/1978 | Mansouri | 210/406 |
| 4,396,505 | 8/1983 | Willson | 210/196 |
| 4,421,647 | 12/1983 | Estabrook et al. | 210/387 |
| 4,571,302 | 2/1986 | Willson | 210/387 |
| 4,673,496 | 6/1987 | Turner | 210/236 |
| 4,826,596 | 5/1989 | Hirs | 210/387 |

FOREIGN PATENT DOCUMENTS

| | | | |
|---|---|---|---|
| 2741710 | 9/1976 | Fed. Rep. of Germany | 210/784 |
| 56-31122 | 7/1981 | Japan | 210/387 |

*Primary Examiner*—Frank Spear
*Assistant Examiner*—Joseph Drodge
*Attorney, Agent, or Firm*—Polster, Polster & Lucchesi

[57] ABSTRACT

Filter apparatus and method for separating contaminants from a liquid stream through at least a partially submerged liquid pervious rotatable drum under negative pressure and having a flexible filtering web fed therearound with that portion of the drum not contacted by the filtering web being covered by a cover means with the filtering web being guided to enter and exit the liquid stream to contact the pervious rotatable drum at preselected angles to make optimum contact with the rotatable drum.

23 Claims, 3 Drawing Sheets

FILTER APPARATUS AND METHOD FOR SEPARATING CONTAMINANTS FROM LIQUIDS

BACKGROUND OF THE INVENTION

The present invention relates to a method and apparatus for filtering liquids and more particularly to a unique and novel method for separating undesirable contaminants from a liquid through a liquid pervious filter support having a filter medium disposed partially therearound, the filter support being under a negative pressure as filtered liquid is removed internally therefrom.

Liquid filtration through an endless filter media support and traveling filter media sheet in contact therewith is generally known in the liquid filtration art, attention being directed to U.S. Pat. No. 2,720,973, issued to M. J. Gross on Oct. 18, 1955, and to U.S. Pat. No. 2,720,973, issued to L. L. Fowler, also issued on Oct. 18, 1955, both of which teach a combined magnetic separator and liquid filter arrangement of the drum type. Further attention is directed to U.S. Pat. No. 3,276,595, issued to J. Houpillart on Oct. 4, 1966 and to No. 3,836,006, issued to Steven S. Davis on Sept. 17, 1974, both of which teach rotatable drum liquid filter combined with contacting filter cloth, the Houpillart patent further teaching a pair of spaced endless belts registering with the marginal edges of the filter cloth to seal such edges against the drum, such a feature being further shown in U.S. Pat. No. 3,807,569, issued to R. L. Shaffer on Apr. 30, 1974. In addition, attention is directed to the rotatable drum filters in U.S. Pat. No. 4,428,838, issued to J. L. Creps, et al., on Jan. 31, 1984; No. 4,467,633, issued to S. N. McEwen, et al., on Aug. 28, 1984; No. 4,507,061, issued to S. N. McEwen, et al., on Mar. 26, 1985; and No. Re. 32,165, issued to J. L. Creps, et al., on May 6, 1986. Finally, attention is directed to U.S. Pat. No. 3,087,620, issued to G. Hirs on Apr. 30, 1963; to U.S. Pat. No. 3,127,256, issued to R. J. Boylan on Mar. 31, 1964; to U.S. Pat. No. 3,690,466, issued to W. J. Lee on Sept. 12, 1972; to U.S. Pat. No. 4,137,169, issued to A. M. El-Hindi on Jan. 30, 1979; and to U.S. Pat. No. 4,186,090, issued to J. Van Oosten on Jan. 29, 1980. All five of these later mentioned patents teach endless or continuous filter web arrangements supportable on foraminous screens in a flat bed arrangement with four of such five patents each including a liquid filter tank to accommodate liquid from the contacting filter web and endless filter support.

For the most part, the numerous structures of the prior art have been comparatively complex in manufacture, assembly and operation, requiring frequent, on-off, vacuum operations through only partially liquid submerged compartmentalized sections with a submergence usually of less than forty (40) percent, necessitating comparatively limited negative pressure levels with the filter media covering well under one half of the filter support face area. The present invention, recognizing the numerous limitations of past liquid filtration apparatus including continuously fed filter media contacting either an endless rotatable drum filter support or a longitudinally extending foraminous endless belt filter support submerged in a liquid tank, provides a unique and novel filter apparatus which includes both an endless filter support and continuously fed filter media contacting such filter support in sealed relation therewith with the filter support in either fully liquid submerged or partially liquid submerged condition with the contacting filter media covering as much as ninety (90) percent of the area of the porous portion of the filter support. In accordance with the novel features of the present invention, maximum contact can be made between the filter media and filter support with liquid filtration being conducted efficiently at comparatively high negative pressures with a minimum of filtration interruption. Further, the present invention provides a novel arrangement for simultaneously indexing the filter support and filter cloth feed during efficient removal of filtered liquids internally from the filter support and, at the same time, allowing efficient removal or stripping of a majority of the contaminants collected on the filter media prior to removal of the media from contact with the filter support. In addition, the present invention allows for modular removal and reinsertion into a liquid treating zone of the entire filtration structure including supply and take-up rolls, filter support and guide assembly.

Various other features of the present invention will become apparent to one skilled in the art upon reading the disclosure set forth herein.

SUMMARY OF THE INVENTION

More particularly the present invention provides a liquid filter apparatus for separating contaminants from liquids comprising: a flow-through liquid treating tank having liquid inlet and outlets to allow contaminated liquids to be circulated therethrough for filtration; an endless filter media support journaled for endless movement in the liquid tank at least partially submerged below a preselected upper liquid level in the tank, the support having a portion of the surface thereof pervious to liquids to be treated; means for moving a web of filter media through the tank in movable contact with a part of the liquid pervious portion of the at least partially submerged endless filter support and for subsequently removing the contaminated portion of the web of filter media from the tank; means for covering the remaining part of the liquid pervious portion of the endless filter support not contacted by the web of filter media; and, pump means connected to the endless filter support to pump liquid filtered by the contaminant web from the liquid tank. In addition the present invention provides a unique and novel method of separating contaminants from liquids comprising: passing contaminated liquids through a flow-through liquid treating zone having a perforated filtering zone at least partially disposed and submerged therein; passing filter media into the liquid treating zone around and in contact with the greater portion of the filtering zone and then out of the liquid treating zone; sealing the remaining portion of the filtering zone not covered by the filter media from fluid passage therethrough; and, pumping filtered liquid from the filtering zone to a preselected location remote from the liquid treating zone.

It is to be understood that various changes can be made in one or more of the several parts of the inventive apparatus disclosed herein and in one or more of the several steps of the inventive method disclosed herein without departing from the scope or spirit of the present invention. For example, instead of the hereinafter described endless filter support in the form of an endless, liquid pervious, rotatable cylindrical drum, it also would be possible to use an elongated liquid pervious endless belt or flat bed arrangement as an endless filter support to carry out the liquid treating steps of the present invention.

BRIEF DESCRIPTION OF THE DRAWINGS

Referring to the drawings which disclose one advantageous embodiment of the liquid filter apparatus of the present invention.

DETAILED DESCRIPTION OF THE INVENTION

Figure 1:
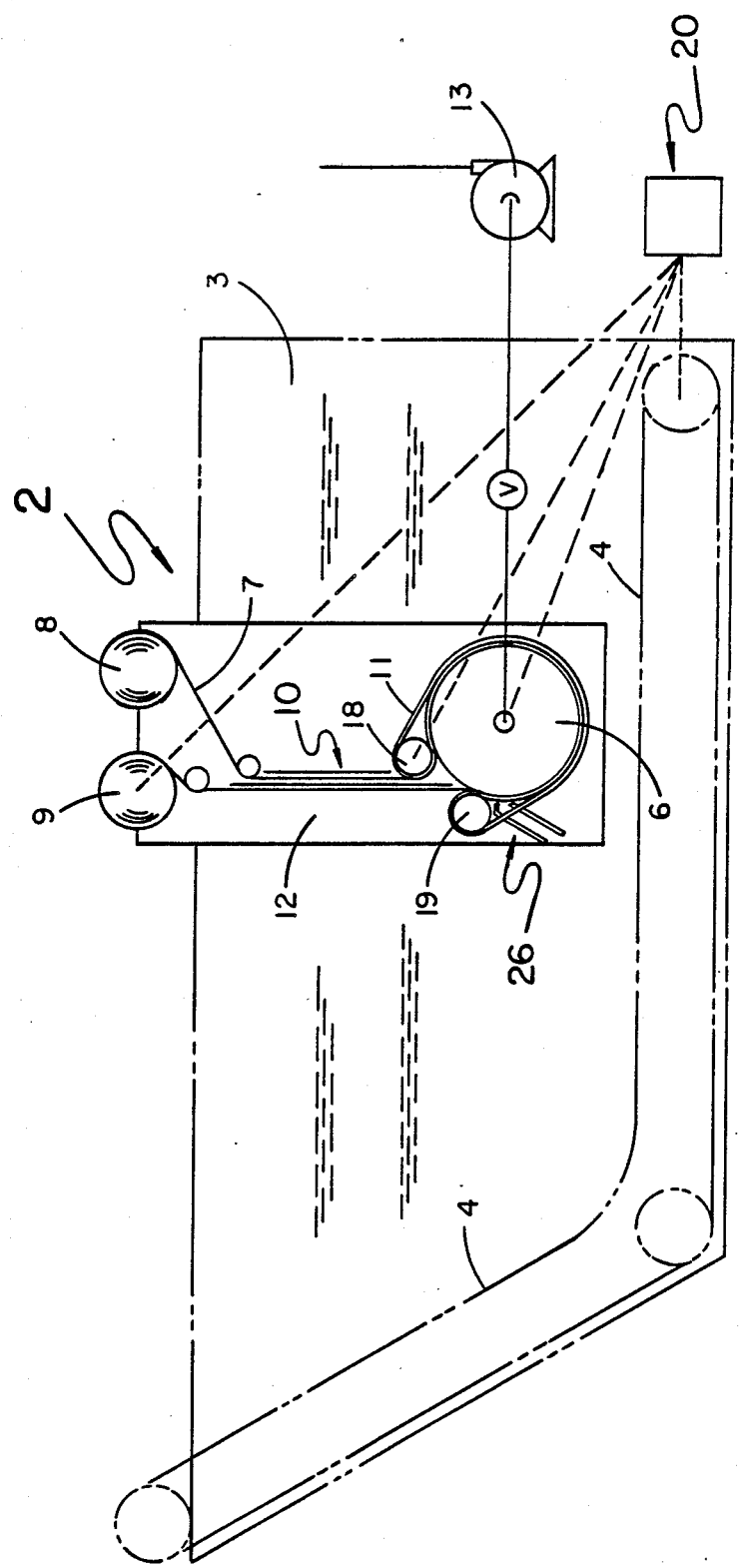
FIG. 1 is a schematic side view of the overall invention.

Referring to FIG. 1, it can be seen that the inventive liquid filter apparatus, broadly referred to by the reference numeral 2, includes a flow-through liquid treating tank 3 with the liquid to be treated being maintained at a preselected level therein. It is to be noted that at least one side wall of tank 3 is outwardly and upwardly sloped at a preselected angle to accommodate the inclined slope of a sloping leg of an endless conveyor belt 4, the other leg of which extends in a horizontal fashion along the bottom portion of treating tank 3 below an endless filter support in the form of a rotatable liquid pervious perforated cylindrical drum 6 closed at opposite ends thereof by suitable end plates (not shown in detail). Drum 6 is disclosed as being completely submerged below the upper liquid level in treating tank 3, but it is to be understood that, in accordance with the present invention, it also would be possible to so position the rotatable drum relative the upper level so that only a portion of drum 6 is submerged.

As also can be seen in FIG. 1, a suitable filter media web 7 can be fed from a filter media supply roll 8 from a position above the upper liquid level in liquid treating tank 3 into contact with rotatable drum 6 and out of the tank unto take-up roll 8, also positioned above the upper liquid level in tank 3. It is to be noted that a filter media web guide assembly broadly referred to by reference numeral 10 and including idle guide rolls and spaced guide plates serves to direct movement of the filter web 7 from supply roll 8 around a maximum portion of rotatable drum 6 and unto take-up roll 9 with the entering and exiting portions of filter web 7 passing through closely or proximately spaced planes substantially normal to the upper liquid level in treating tank 3 thereby assuring a covering of an optimum and major portion of the perforated cylinder of rotatable cylindrical drum 6. Although not shown in detail in the drawings, it is to be understood that rotatable drum 6, filter media take-up roll 9, endless conveyor belt 4 and a pair of spaced endless belts 11, cooperable with the extremities of drum 6 and described hereinafter, can be either separately or synchronously driven hydraulically and/or electrically such as by a suitable power drive assembly 20 (schematically shown in FIG. 1) which drives the take-up roll 9, rotatable drum 6, conveyor belt 4 and endless belts 11 in indexed relation at advantageously 30° increments in accordance with a predetermined and sensed contaminant collection on filter media web 7, or a sensed vacuum pressure in drum 6, or in accordance with preselected, timed intervals. Further, it is to be understood that the opposed ends of rotatable drum 6, idle supply and driven take-up rolls 8 and 9 respectively, the idle guide rolls of guide assembly 10 and the opposed ends of guide rolls 18 and 19 for spaced endless belts 11, all can be journaled with their respective longitudinal axes in horizontal planes in appropriately spaced relation in a pair of horizontally spaced vertical standards 12, the lower portion of which extends into treating tank 3, only one of such spaced standards being disclosed in FIGS. 1-3 of the drawings. These standards 12 which also support guide assembly 10 further serve to support a scraper assembly 26 therebetween, described hereinafter. With such a modular arrangement it is possible to remove the entire journaled unit including the guide assembly 10 and scraper assembly 26 into and out of a liquid treating tank in an efficient, straightforward manner. Moreover, it is to be understood that anyone of a number of suitable liquid resistant filter medias can be employed as web 7, and advantageously web 7 can be a non-woven synthetic polyester blend media such as rayon media designated "SNOFIL" TM, sold by Snow Filtration Company of Cincinnati, Ohio. The media can be of various weights, advantageously in the range of 0.5 oz/yd$^2$ to 3.0 oz/yd$^2$, furnished in supply rolls in the range of 250 to 2000 yds/roll.

As can be seen in the schematic illustration in FIG. 1 of the drawings, a suitable pump 13, which is disclosed as external to tank 3 can be of the centrifugal type and, is connected by a suitable conduit disclosed schematically as passing from external pump 13 through an appropriate aperture in the side wall of tank 3 internally to rotatable drum 6 to siphon filtered liquid therefrom for recirculation to its liquid system, such as a system for cooling and lubricating, an assembly of machine tools. Referring to detailed FIG. 3 of the drawings, it can be seen that pump 13 can be connected by such conduit through the side wall of tank 3 internally to rotatable drum 6 by a a siphon conduit 14 that has one internal end 16 thereof extending internally into the perforated cylindrical wall of rotatable drum 6 through an outlet passage provided in an end plate of rotatable drum 6 with the central axis of siphon conduit 14 being disposed along the rotational axis of drum 6 and the outer wall of conduit 14 sealed to the end plate through which it extends. It, of course, is to be understood that the other or external end 17 of conduit 14 is rotatably sealed in a suitable manner (not shown) to the main line (schematically disclosed) leading through the side wall of tank 3 to the low pressure end of pump 13, as above described. The cylindrical portion of rotatable drum 6 can advantageously include one eighth ($\frac{1}{8}$) inch diameter perforations to provide openings in approximately forty (40) percent of the cylindrical area. Further, it is to be understood that instead of a perforated cylinder it also would be possible to use a cylinder fabricated from a suitable liquid pervious wedge wire material.

Figure 3:
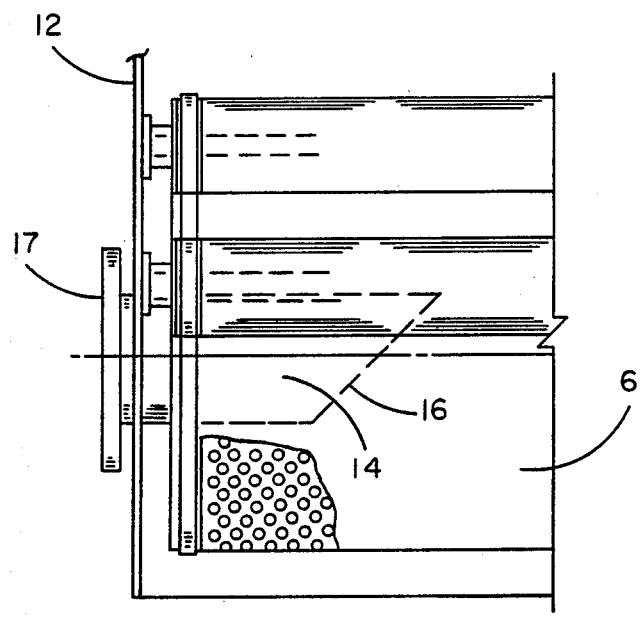
FIG. 3 is an enlarged partially broken away side view of a portion of the filter media in contact with the rotatable drum, disclosing details of the siphon conduit extending internally into the rotatable drum; and, FIG. 4 is a further enlarged partial side view of the rotatable drum, guide assembly, the filter media web and the yieldably positioned cover plate in covering relation with that portion of the rotatable drum not contacted by the filter media web.
Figure 4:
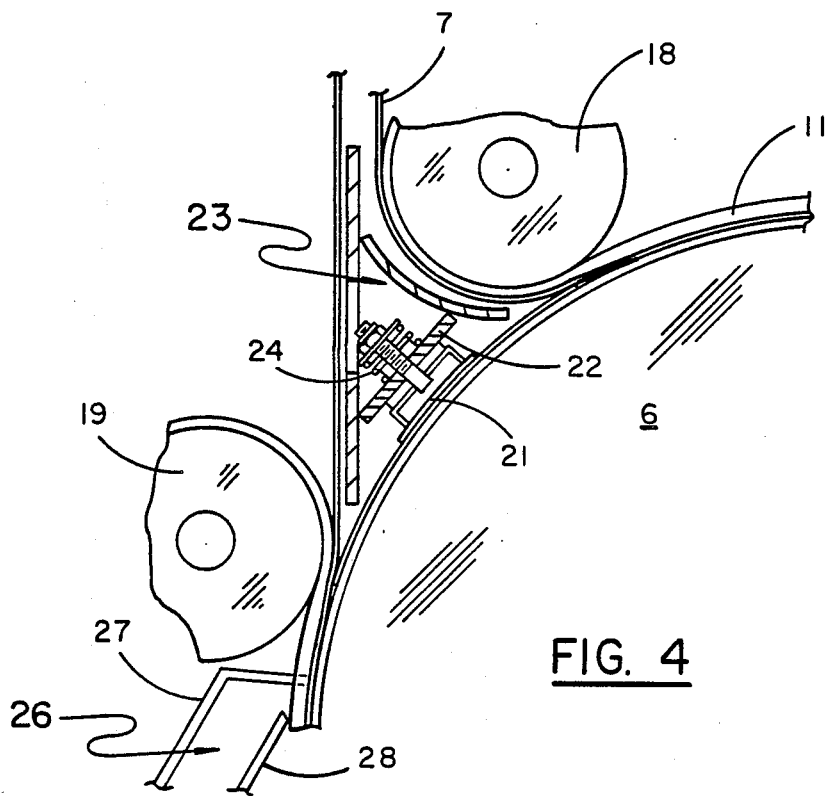

Referring to FIGS. 1, 3 and 4 of the drawings, it can be seen that the opposed longitudinal side edges of filter media web 7, the body of which web is held in snug contact with cylindrical portion of drum 6 by the internal negative pressure therein created by pump 13, are maintained in sealed relation against the extremities of rotatable drum 6 by the abovementioned spaced endless belts 11 which extend around the major portion of the opposed extremities of rotatable drum 6 and are mounted in endless fashion around the spaced guide rolls 18 and 19, journaled as above discussed between the spaced standards 12. It is to be understood, as also above discussed, that one of these guide rolls can be synchronously driven through the power drive assembly 20 which drives take-up roll 8 and rotatable drum 6. Alternatively, both guide rolls can be idler rolls rotatable with movement of the drum and belt. As also can be seen in FIG. 4 of the drawing, an appropriately sized curved plate 21, which is contoured to conform with rotatable drum 6, is floatingly and yieldably mounted on bar 22, the extremities of which bar are fastened to a structural, horizontally extending cross member assembly 23 mounted between spaced vertical standards 12. An appropriately tensioned and adjustable helical spring assembly 24 maintains curved plate 21 in yieldable, floating position against that remaining portion of rotatable drum 6 which is not covered by filter media web 7, which web 7 extends around the major portion of drum 6. Thus, it is possible to maintain an internal vacuum in rotatable drum 6 through siphon conduit 14 and pump 13 connected thereto as high as twenty (20) inches of mercury (Hg) and advantageously at approximately fifteen (15) inches of mercury (Hg) to efficiently hold the body of the media in drum contact and to siphon and recirculate filtered liquid from the filtering apparatus.

Figure 2:
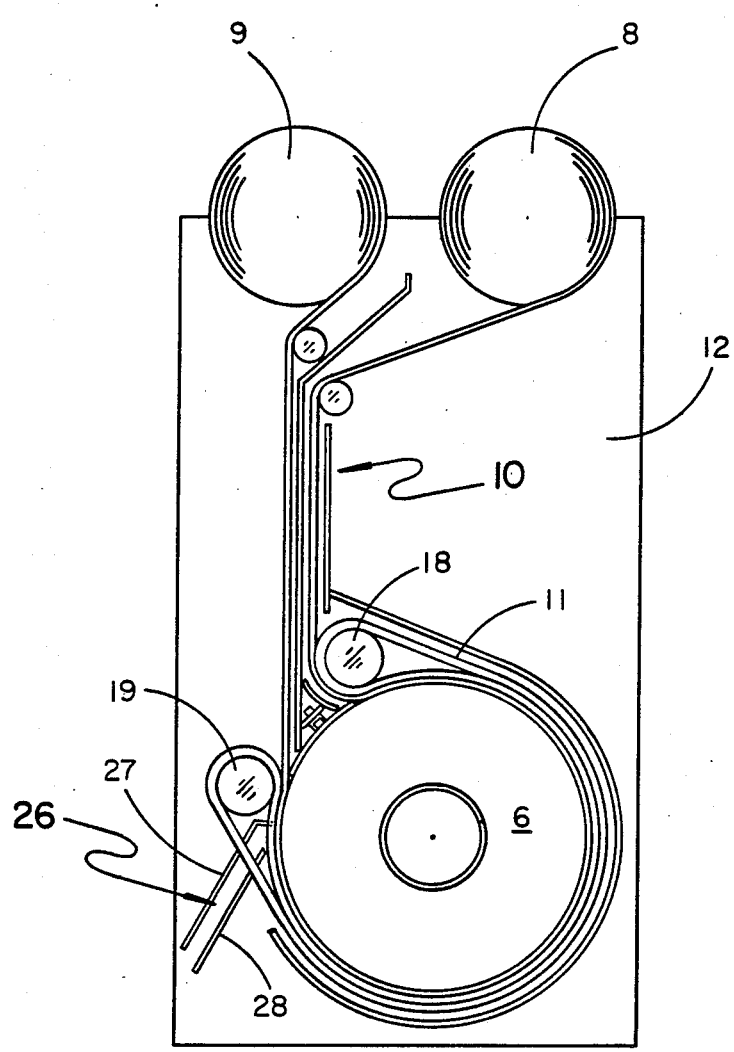
FIG. 2 is an enlarged side view of a portion of FIG. 1, disclosing details of the filter media web as it is moved from a supply roll through a guide assembly into contact with an endless filter support in the form of a rotatable drum and then unto a take-up roll.

As can be seen in FIGS. 2 and 4 of the drawings, a horizontally extending scraper or wiper assembly 26 is mounted between spaced vertical standards 12. Assembly 26 includes a horizontally extending angle bar or wiper blade 27 and a spaced parallel, horizontally extending guide chute 28 positioned therebelow adjacent the web of filter media 7 and extending downwardly to a location above endless conveyor belt 4 to remove contaminants collected on the web 7. It is to be noted that the upper extremities of angle bar 27 and guide chute 28 spaced therebelow are located immediately adjacent that area of rotatable drum 6 where filter web 7 splits from drum 6 to pass to take-up roll 9, the guide chute 28 serving to direct separated contaminants unto endless conveyor belt 4 at a quiescent location in the liquid treating tank 3.

In carrying out the inventive method of separating contaminants from liquids, the contaminated liquids are passed to a liquid treating zone, which in the instant embodiment includes the liquid treating tank 3. This liquid treating zone has a filtering zone disposed therein (filter media support drum 6) over which filter media (web 7) is moved in preselected increments along a first plane substantially normal to the upper liquid level in the liquid treating zone. The filter media (web 7) is moved around and in contact with the greater portion of the filtering zone (filter media support drum 6 and contacting filter web 7) to a take-up zone (take-up roll 9) exiting from the filtering zone along a second plane substantially normal to the liquid treating zone and proximately spaced from the first plane to maximize filter zone efficiency. The remaining portion of the filtering zone is sealed from fluid passage therethrough (curved plate 21) as is the filter media sealed into contact with the filter zone (pump 13 and spaced endless belts 11). The filtered liquid is pumped from the filtering zone (siphon tube 14 and pump 13) to a preselected location remote from the liquid treating zone with the contaminants being separated (scraper or wiper assembly 26) from the filter media immediately before the media exits from the liquid treating zone and removed in an endless fashion from such liquid treating zone (endless conveyor belt 4). Although the several steps of this inventive method can be carried out by the inventive apparatus above described, it again is to be understood that other apparatus of different configuration can be utilized to carry out the inventive method, such as the aforedescribed longitudinally extending endless foraminous screen filter media support and endless or continuously fed filter belt contacting therewith the screen and belt being submerged, partially or totally, in a liquid treating zone, either in a horizontal, vertical or angled position.

The invention claimed is:

1. Liquid filter apparatus for separating contaminants from liquids comprising:
   a flow-through liquid treating tank having a contaminated liquid inlet and a clean liquid outlet to allow contaminated liquids to be circulated therethrough for filtration;
   an endless filter media support journaled for rotation in said liquid tank at least partially submerged below a preselected upper liquid level in said tank, said support having a portion of the surface thereof pervious to liquids to be treated;
   means for moving a web of liquid pervious filter media through said tank in movable surface contact with a part of the liquid pervious portion of said at least partially submerged movable endless filter media support to entrap contaminants from contaminant liquid passed therethrough on a portion of said filter media web and for subsequently removing the so contaminated portion of said web of filter media from said tank;
   a longitudinal extending guide assembly means for guiding movement of said web of liquid pervious media from a supply source to enter into said tank and into contacting relation with and around a greater portion of the perforated surface of said submerged part of said endless filter media support and away from said filter media support to exit said tank to a take-up source with said web of liquid pervious filtering media engaging and leaving said perforated surface of said filter media support in spaced proximate substantially parallel, verticle planes and covering an optimum portion of said perforated surface;
   means for covering the liquid pervious portion of said endless filter media support not contacted by said guided web of filter media and any part of said support extending above said preselected upper liquid level; and,
   pump means connected to said endless filter support to pump liquid filtered by said contacting web from said liquid tank.

2. The liquid filter apparatus of claim 1, said endless filter media support being journaled for rotation in said liquid treating tank of be fully submerged below a preselected upper liquid level in said tank.

3. The liquid filter apparatus of claim 1, said means for covering the liquid pervious portion of said endless filter media support not contacted by said filter media and above said upper liquid level including a plate floatingly and yieldably positioned to contact and cover said portion of said filter media support.

4. The liquid filter apparatus of claim 1, said means for covering the liquid pervious portion of said filter media support not contacted by said filter media and above said upper liquid level including a plate contoured to conform with said portion of said filter media support, said plate being in floating and spring yielding contacting position and covering relation with said liquid pervious portion of said filter media support.

5. The liquid filter apparatus of claim 1, and means to urge the opposite edges of the web of clean filter media into contact with said filter media support at least over that part of said web in contact with said filter media support.

6. The liquid filter apparatus of claim 1, and a pair of spaced endless belts arranged to urge the opposite side edges of the web of clean filter media into sealing contact with said filter media support at least over that part of said web in contact with said filter media support.

7. The liquid filter apparatus of claim 1, said web of filter media being cleanable and reusable in endless belt form.

8. The liquid filter apparatus of claim 1, said web of filter media being fed from an idle supply roll and collected on a driven take-up roll.

9. The liquid filter apparatus of claim 1, said means for moving said web being synchronous with the movement of said filter media support.

10. The liquid filter apparatus of claim 1, said endless filter media support being a rotatable drum including a perforated cylinder to support said filter media.

11. The liquid filter apparatus of claim 1, said endless filter media support being a rotatable drum including a liquid pervious wedge-wire cylinder to support said filter media.

12. The liquid filter apparatus of claim 1, said filter media support being of cylindrical shape including spaced liquid impervious end plates and a cylindrical liquid pervious wall extending therebetween to support said filter media, with said pump means being connected to said drum through a siphon duct extending through one of said end plates in axial alignment with the axis of rotation of said filter media support.

13. The liquid filter apparatus of claim 1, and contaminant wiper means adjacent said web of filter media to remove contaminants collected thereon and an endless conveyor belt extending within said tank below said filter media support and said wiper means to a location beyond said flow-through tank to empty filtered contaminants deposited thereon.

14. The liquid filter apparatus of claim 1, said apparatus further including a pair of spaced vertical standards with a supply roll, a take-up roll, and said guide assembly journaled therein along with said filter media support to form a modular unit adapted for ready insertion and removal from said liquid treating tank.

15. The liquid filter apparatus of claim 1, said endless filter media support being an elongated endless belt.

16. A liquid filter apparatus for separating contaminants from liquids comprising:
a flow-through liquid treating tank having an open-ended top serving as a liquid inlet to receive contaminated liquids to be treated, an apertured side wall serving as an outlet passage to recycle clean filtered liquid, said tank having at least one other wall thereof sloping outwardly from bottom to top;
a liquid pervious endless filter media support in the form of a perforated rotatable vacuum drum with perforations providing a forty (40) percent open area journaled for rotation in said tank completely submerged below the liquid level in said tank, said drum including spaced liquid impervious and plates and a perforated liquid pervious cylindrical wall extending therebetween;
a filter media supply roll of non-woven synthetic polyester material and a take-up roll positioned in spaced relation above said rotatable vacuum drum;
a longitudinally extending guide assembly means for directing movement of a web of clean filter media from said supply roll into said tank and into contacting relation with and around a greater portion of said pervious cylindrical wall of said drum and away from said drum and out of said tank to said take-up roll with the entering and exiting portions of said web above the liquid level of said tank passing through proximately spaced parallel planes substantially normal to the liquid level in said tank;
a curved plate contoured to conform with said drum, said plate being floatingly mounted and yieldably positioned into contacting and covering relation with the portion of said drum not contacted by said web of filter media between a pair of spaced endless belts cooperatively mounted at opposite sides of said guide assembly to extend in endless fashion around opposite extremities of said drum to urge the opposite side edges of the web of filter media into sealing contact with opposed extremities of said drum cylindrical wall;
a siphon conduit extending internally into the perforated cylindrical wall of said rotatable drum through an outlet passage provided in an end plate of said rotatable drum in sealed engagement therewith;
a pump connected to said siphon conduit to pump filtered liquid from said drum to a recycling area;
a contaminant wiper blade extending between said pair of endless belts adjacent said web of filter media immediately before said filter media is stripped from said drum to move to said take-up roll;
an endless conveyor belt disposed in said tank below said drum and wiper blade and extending adjacent said sloping wall thereof to a location beyond said tank to empty filtered contaminants deposited thereon; and,
a power drive assembly to drive said filter media take-up roll and said perforated vacuum drum in indexed relation to move said filter media over said drum accordingly.

17. A method of separating contaminants from liquids comprising:
passing said contaminated liquids through a flow-through liquid treating zone having a perforated filter media support journaled for rotation and at least partially disposed and submerged therein;
passing and guiding filter media by means including a longitudinally extending guide assembly to enter into said liquid treating zone around and in optimum contact with the greater portion of said perforated support, and then exit from said liquid treating zone with the filter media engaging and leaving said perforated support in guided proximate, closely spaced substantially parallel, vertical planes;
sealing any unsubmerged portion of said perforated support and that portion not contacted by the guided filter media from fluid passage therethrough; and, pumping filtered liquid from said submerged filtering zone to a preselected location remote from said liquid treating zone.

18. The method of separating contaminants from liquids of claim 17, and removing separated contaminants from said liquid treating zone.

19. The method of separating contaminants from liquids of claim 17, said filter media being passed from a supply zone outside said liquid treating zone through said liquid treating zone in contact with said filtering zone to a take-up zone outside said liquid treating zone.

20. The method of separating contaminants from liquids of claim 19, said filter media being joined at opposed ends as an endless belt to be passed in continuous, endless fashion into and out of said liquid treating zone; and, cleaning said filtering media immediately before exiting said liquid treating zone.

21. The method of separating contaminants from liquids of claim 19, and sealing the side edges of said filter media into contact with said filtering zone.

22. The method of separating contaminants from liquids of claim 19, wherein said filter media is passed through said zones in preselected increments.

23. A method of separating contaminants from liquids comprising:

passing said contaminated liquids through a flow-through liquid treating zone having a liquid flow-through filter media support journaled for rotation and fully disposed and submerged therein;

passing and guiding filter media by means including a longitudinallyextending guide assembly from a supply zone in preselected increments into said liquid treating zone along a first plane substantially normal to the upper liquid level in said liquid treating zone, around and in contact with the greater portion of said support including a porous filter media support to a take-up zone along a second plane substantially normal to said upper liquid level in said liquid treating zone and proximately spaced from said first plane with said filter media entering and exiting from said upper liquid level in proximate closely spaced parallel planes, normal to said upper liquid level and covering up to at least ninety (90) percent of the area of the porous portion of said filter media support;

sealing the not contacted portion of said support from fluid passage therethrough and sealing the side of said filter media into contact with said support;

pumping filtered liquid from said filtering zone to a preselected location remote from said liquid treating zone;

removing separated contaminants from said filter media immediately before its exiting said liquid treating zone to enter said take-up zone; and, removing said removed separated contaminants in an endless fashion from said liquid treating zone.

* * * * *